United States Patent [19]
Langfeldt et al.

[11] Patent Number: 6,054,101
[45] Date of Patent: Apr. 25, 2000

[54] METHOD AND DEVICE FOR HEAT-TREATING PLASTER

[75] Inventors: Claudia Langfeldt, Coburg; Paul Bernhard Kroehl, Ravensburg, both of Germany

[73] Assignee: CT Umwelttechnik GmbH, Ravensburg, Germany

[21] Appl. No.: 09/125,407

[22] PCT Filed: Feb. 17, 1997

[86] PCT No.: PCT/EP97/00743

§ 371 Date: Apr. 20, 1999

§ 102(e) Date: Apr. 20, 1999

[87] PCT Pub. No.: WO97/30004

PCT Pub. Date: Aug. 21, 1997

[30] Foreign Application Priority Data

Feb. 19, 1996 [DE] Germany ............... 196 06 075

[51] Int. Cl.⁷ .................... C04B 11/06; C04B 11/02
[52] U.S. Cl. ................................................. 422/142
[58] Field of Search ........................... 423/171, 172, 423/554, 555; 106/722, 772, 775, 786; 422/141, 142, 145, 146, 147

[56] References Cited

U.S. PATENT DOCUMENTS

| | | | |
|---|---|---|---|
| 4,247,518 | 1/1981 | Charlet et al. | 422/142 |
| 5,437,850 | 8/1995 | Kroehl et al. | 423/171 |

FOREIGN PATENT DOCUMENTS

| | | |
|---|---|---|
| 2311764 | 12/1976 | France . |
| 610439 | 10/1948 | United Kingdom . |
| 1002722 | 8/1965 | United Kingdom . |
| WO 87/03508 | 6/1987 | WIPO . |
| WO 92/16468 | 10/1992 | WIPO . |

OTHER PUBLICATIONS

Chemical Abstracts, vol. 89, No. 8, Aug. 21, 1978, Columbus, Ohio, US; Abstract No. 6379j; D.T. Mitev, et al.: "Continous burning of gypsum in the fluidised bed (II)", p. 262; XP002031976, & Wiss. Z. Hochsch. Archit. Bauwes., vol.,.24, No. 4–5, 1977, Weimar, pp. 409–414.

Chemical Abstracts, vol. 113, No. 20, Nov. 12, 1990, Columbus, Ohio, US; abstract No. 177262q, M. Nakagawa et al., p. 312; XP000192625, & JP 02 038 347 A.

Primary Examiner—Steven P. Griffin
Assistant Examiner—Maribel Medina
Attorney, Agent, or Firm—Townsend and Townsend and Crew LLP

[57] ABSTRACT

Disclosed is a method and device for heat-treating plaster which is calcined to form hemihydrate plaster or anhydrite. Calcining to form hemihydrate plaster is carried out in at least one fluid bed region in which the water vapor partial pressure and material temperature are adjusted. The at least one fluid bed region can be followed by a further fluid bed region in which the anhydrite is formed and the water vapor partial pressure and material temperature are also adjusted. In addition, a fluid bed region can be provided for cooling purposes before the product-discharge point.

14 Claims, 1 Drawing Sheet

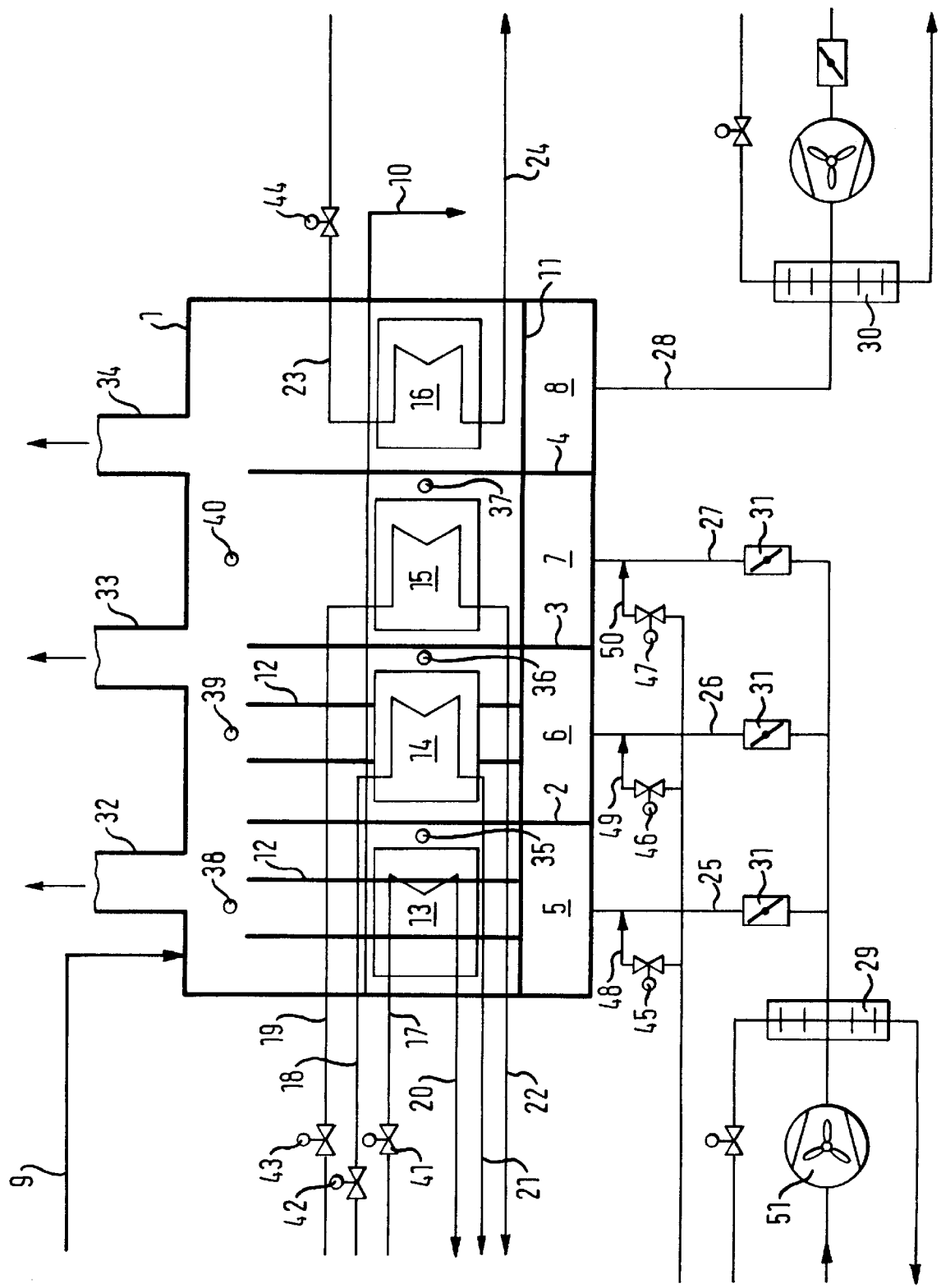

METHOD AND DEVICE FOR HEAT-TREATING PLASTER

This application is a 371 of PCT/EP97/00743 filed on Feb. 17, 1997, now WO 9730004A1.

BACKGROUND OF THE INVENTION

The present invention relates to a method for the thermal treatment of gypsum in which the material is dewatered in a continuous process in the fluidized bed with inbuilt heat exchange surfaces. The invention also relates to an apparatus for carrying out this method.

Moist gypsum, i.e. calcium sulfate-dihydrate to which moist gypsum from exhaust gas disulfurizing plants, so-called REA-gypsum, also belong, can be surface dried at temperatures up to about 60 to 70° C. without removing the water of crystallization. At temperatures up to about 150° C. the extraction of the water of crystallization takes place above all through the formation of the hemihydrate. Of this there are the alpha or beta modifications, with the beta modification mainly arising. Above these temperatures the anhydrite modifications arise, depending on the temperature level, through complete extraction of the water of crystallization, starting with the so-called AIII gypsum, a very reactive component with short setting time, followed by sluggishly reacting AIIs of poor solubility and the inert AIIu gypsum. These differences are attributed to the surface nature modified by the thermal treatment.

In order to obtain a calcined gypsum with constant and/or pure phase composition it is necessary to be able to control the temperature profile very precisely during the manufacture. No instances of overheating and inhomogeneities may be present during the thermal treatment which lead to undesired phase conversions for individual particles of the material.

In order to prevent undesired phase conversions already in the drying stage, a two-stage method for the production of calcined gypsum with adjustable phase composition is described in DE 41 09 743. In this method the drying of moist gypsum is carried out in the first stage in a fluidized bed apparatus with inbuilt heat exchange surfaces at a low temperature level. In the second stage the dried gypsum is treated in a second fluidized bed apparatus with inbuilt heat exchange surfaces at a low temperature level, in order to remove the water of crystallization. In both fluidized bed apparatuses the heat which is used is admitted with the fluidization gas and the heat exchange surfaces, with the heat being predominantly introduced via the heat exchange surfaces.

In this method the quality of the calcined gypsum is significantly improved in comparison to other previously known methods; however the purity and the constancy of the phase composition of the calcined gypsum is not yet entirely satisfactory. Moreover, in this method, a drying step is always necessary.

The difficulty in the calcining of gypsum lies in the fact that all the phases can exist alongside one another and, in distinction to other hydrates, no clear equilibrium state defined only by the temperature can be achieved in the technical apparatus as a result of inhibited reactions. The dewatering and phase formation takes place at the individual particles from the particle surface to the particle core in dependence on the temperature and the dwell time. Each particle contains the following phases during the calcining: externally anhydrite (for example AIII), in the interior dihydrate and in the intermediate region β-hemihydrate. The proportions of these phases, i.e. the degree of calcining, depends on the particle size. Under the same conditions, small particles have a lower dihydrate content than large particles, i.e. a higher degree of calcining.

SUMMARY OF THE INVENTION

It is an object of the present invention to provide a method of the initially named kind in which a calcined gypsum with high purity and constancy is obtained in the phase composition. Furthermore, a method is to be provided in which both dried gypsum and also moist gypsum can be used as the starting material. Furthermore an apparatus is to be proposed for carrying out the method.

Starting from the initially named method this object is satisfied in that the material is led through at least one fluidized bed zone and in this zone both the water vapor partial pressure and also the material temperature are set for the formation of phase pure beta-hemihydrate at the outlet of the at least one zone.

In the method of the invention, through the setting of both the temperature and also of the water vapor partial pressure in the at least one zone during the calcining, the formation of anhydrite in this zone, for example the reactive AIII-phase, is prevented until the dehydration of the dehydrate to the beta-hemihydrate has been concluded. The suppression of the anhydrite formation is energetically more advantageous in comparison to customary subsequent reverse conversion to the hemihydrate because it is not necessary to expend the heat of dehydration.

Anhydrite III, which can already be at least partly present in the starting material which is supplied to the calcining as a result of a prior treatment, is likewise converted back into the hemihydrate phase in the method of the invention in the at least one zone.

For smaller apparatuses one fluidized bed zone is sufficient in order to produce phase pure beta-hemihydrate. For larger apparatuses it can be necessary to provide more than one fluidized bed zone for the formation of the hemihydrate. In each of these additional zones the water vapor partial pressure and the material temperature are likewise set in each case. Through the setting of the water vapor partial pressure and the material temperature separately in each of the additional fluidized bed zones an anhydrite formation is reliably prevented in each of these zones.

When the desired end product is the hemihydrate then at least one fluidized bed zone for the hemihydrate, formation can be followed by a cooling zone in which a cooling medium is supplied to the heat exchange surfaces in the fluidate layer and into which slightly tempered fluidizing gas is introduced, i.e. with a temperature substantially below the product temperature.

A further fluidized bed zone for the anhydrite formation is provided between the at least one fluidized bed zone for the hemihydrate formation and the cooling zone, in order to use the method and the apparatus both for the beta-hemihydrate formation and also for the anhydrite III formation, and the water vapor partial pressure and the material temperature can also be set in this further zone. In this embodiment the water vapor partial pressure and the material temperature are set in the further fluidized bed zone to values at which no anhydrite forms insofar as the hemihydrate is desired as the final product. When the anhydrite, or a hemihydrate/anhydrite mixture of a specific composition, is desired as the end product the water vapor partial pressure and the material temperature are set in this further fluidized bed zone to values at which the hemihydrate is converted fully or partly into anhydrite.

The different zones, i.e. the at least one hemihydrate zone, the further anhydrite zone, and also the cooling zone can be arranged in separate fluidized bed apparatuses with conveying means in order to transport the material to be treated from one fluidized bed apparatus into the next. It is however simpler apparatus-wise, and thus preferred, to arrange the zones in one fluidized bed apparatus in which they are separated from one another by separating weirs, which are provided with openings for the material flow from one zone into the next. Additional separating weirs can be arranged within each zone in order to achieve a narrower dwell time spectrum of the material to be treated.

Moist or dry gypsum can be used as the starting material.

When using only one zone the hemihydrate formation takes place up to and into the interior of the material particles in this one zone without the anhydrite forming. In the following the method will be described with reference to a preferred embodiment in which two zones are used for the beta-hemihydrate formation. The following statements regarding the setting of the water vapor partial pressure and the temperature in the first zone also apply correspondingly when only one zone is used for the hemihydrate formation.

When using moist gypsum a relative large amount of water vapor is liberated in the first zone, so that the danger of the water vapor partial pressure sinking below the desired value and anhydrite forming at the particle surfaces is less. With dry gypsum less water vapor is liberated in the first zone than when using moist gypsum as the starting material. Compared with the second zone more water vapor is liberated in the first zone because the liberation of the water of crystallization in the regions of the gypsum particles close to the surface takes place more easily and quickly than the liberation in the regions close to the core.

In any event a setting of the water vapor partial pressure takes place in the first zone. This setting can take place in such a way that the water vapour partial pressure is measured, preferably above the fluidized bed. If the desired value falls short then water vapor is supplied to the first zone. The setting of the water vapor partial pressure can also take place in that the moisture of the starting material, the quantity of the starting material and the quantity of the fluidizing gas which is introduced into the fluidized bed zone are measured. From these values the water vapor partial pressure of the exhaust gas of the fluidized bed during the manufacture of the hemihydrate can be calculated. If this calculated value is too low, then the corresponding quantity of water vapor is introduced into the fluidized bed zone so that the desired value is achieved. With this setting of the water vapor partial pressure a measuring apparatus for determining the water vapour partial pressure in the apparatus is not required. The supply means for the fluidizing gas is then to be provided with a through-flow measurement apparatus.

Through the setting of the water vapor partial pressure in the first zone the formation of anhydrite at the surface of the particles is prevented and anhydrite contained in the starting material is converted into gypsum hemihydrate. The water vapor is preferably supplied to the fluidized bed of this first zone with the fluidizing gas, as a rule air. The water vapor partial pressure in the at least one zone for the hemihydrate formation is set, as a rule, to a value in the range from 0.1 to 1.1 bar, preferably 0.5 to 1 bar. The selected value also depends on the material temperature set in the respective zone.

In the first zone a setting of the material temperature is provided in addition to the setting of the water vapor partial pressure. The temperature in the fluidized bed is measured, the measured value is compared with a desired value and the heat supply is correspondingly reduced, increased or left unchanged. The largest part of the heat supply to the fluidized bed takes place via the heat exchanger surfaces and the smaller part takes place via the fluidization gas. The setting of the desired material temperature is preferably effected via the temperature and/or the quantity of the heating medium flowing through the heat exchange surfaces, as a rule steam or thermal oil. It is basically possible, on a deviation of the actual value from the desired value, to change also the temperature of the fluidizing gas or the through-put of the material.

The selected material temperature, i.e. the desired value, depends on the dwell time of the material in the zone. In general, the material temperature is selected to be lower with a higher dwell time than with a short dwell time. In the at least one zone, in which the hemihydrate formation takes place, the material temperature can lie, depending on the dwell time, in the range from about 100° to 150° C. The selected temperature within this range also depends on the water vapor partial pressure that is set. As a rule a higher product temperature can be set with higher set water vapor partial pressures.

In the second zone a setting of the water vapor partial pressure and of the product temperature is effected separately from the first zone. The calcining to the phase pure hemihydrate takes place in the second zone or, if more than two zones are provided for the hemihydrate formation, in the additional zones. The same applies with respect to the water vapor partial pressure and the temperature setting as was explained above with respect to the first zone. The level of the water vapor partial pressure and the product temperature in the second zone can, but need not, differ from the values of the first zone. The set values depend on the material to be calcined, for example the particle size, on the zone size and thus on the dwell time and also the already mentioned mutual influence of the water vapor partial pressure and the material temperature. The ideal values can in each case be found by simple tests.

A further fluidized bed zone preferably joins the at least one fluidized bed zone and can be used partly or fully for the anhydrite formation. It can however also be exploited, as already explained further above, as a conveyor path for the hemihydrate into the cooling zone, when the desired end product is the hemihydrate. In this case the water vapor partial pressure and product temperature in this fluidized bed zone are kept to values at which the hemihydrate is not changed.

If one desires an anhydrite or a specific mixture of hemihydrate and anhydrite as the end product then lower water vapour partial pressures and higher product temperatures, as a rule above 150° C., are set in this fluidized bed zone than are set in the at least one zone for the hemihydrate formation. The levels of the two values depend on the desired proportions of hemihydrate and anhydrite in mixture.

At least one cooling zone for the final product preferably adjoins the fluidized bed zone for the anhydrite formation. This cooling zone is also a fluidized bed with heat exchange surfaces. The cooling zone can likewise be provided with a temperature setting and a water vapor partial pressure setting.

BRIEF DESCRIPTION OF THE DRAWINGS

The invention will be explained in more detail with reference to the drawing which shows a schematic illustration of a preferred embodiment of the invention.

DESCRIPTION OF THE PREFERRED EMBODIMENTS

Reference numeral 1 designates a fluidized bed apparatus. In this apparatus there are provided separating weirs 2 to 4 which subdivide the apparatus into the chambers (zones) 5 to 8 through which the material supplied via the inlet 9 into the fluidized bed apparatus flows one after the other. The separating weirs 2 to 4 are provided with non-illustrated openings for the material throughflow. The chambers 5 and 6 are for the gypsum hemihydrate formation, the chamber 7 for the gypsum anhydrite formation and the chamber 8 is for the cooling of the product before it leaves the apparatus via the product outlet 10. Additional separating weirs 12 provided with openings are present in the chambers 5 and 6, above the distribution base 11 for the fluidizing gas, in order to achieve a narrower dwell time spectrum before the material to be calcined.

Heat exchangers 13 to 16 are arranged in the chambers 5 to 8. The heat exchangers 13 to 15 are supplied with heating medium via the lines 17 to 19 which flows away again out of the heat exchangers via the lines 20 to 22. The cooling medium is supplied to the heat exchangers 16 via the line 23 and flows away again via the line 24. The supply means 25 to 28 for the fluidizing gas are provided in the chambers 5 to 8 beneath the distribution base 11 for the fluidizing gas. Fluidizing gas heated by a register 29 is directed by the supply means 25 to 27 into the chambers 5 to 7. Fluidizing gas tempered by a register 30 is directed into the cooling chamber 8 via the supply means 28. The quantity of the fluidizing gas which is supplied to the chambers 5 to 7 can be regulated via throughflow regulators 31.

The quantity of the heating medium or cooling medium, and thus the temperature of the heat exchangers 13 to 16, can be set via valves 41 to 44 in the supply lines 17 to 19 and 23 respectively. Exhaust gas channels 32 to 34 are provided above the chambers 5 to 8. In each of the chambers 5 to 7 a temperature sensor is arranged in the fluidized bed which are designated with 35 to 37. Furthermore, measuring apparatuses 38 to 40 for the water vapor partial pressure are provided above the fluidized bed in the chambers 5 to 7.

Through this arrangement the water vapor partial pressure and also the material temperature can be measured in each of the chambers 5 to 7 and can be set to different values from chamber to chamber. With a deviation of the measured value from the desired value the temperature and/or the water vapor partial pressure in the relevant chamber can be set via non-shown regulating circuits. For the temperature the setting takes place via the respective heat exchanger 13, 14 or 15 in that the quantity of heating medium supplied to it is modified via the relevant valve 41, 42 or 43 in the feedline 17, 18 or 19. For the water vapor partial pressure the setting takes place via the feeding in of the water vapor through the lines 48, 49 or 50 provided with the valves 45 to 47 into the supply means 25, 26 or 27 for the fluidizing gas. Fresh steam can however be fed in via the lines 48 to 50. It is also possible to use, for example, the water vapor rich exhaust gas from the channel 32 for the feeding into the line 49 or 50, providing the water vapor partial pressure in the chamber 6 or 7 is too low.

One fan and one register can also be used for each of the supply means, instead of the fan 51 shown in the figure and the one register 29 for all the three supply means 25 to 27 for the fluidizing gas.

What is claimed is:

1. Apparatus for the thermal treatment of gypsum in a fluidized bed comprising a material inlet and a product outlet, with a plurality of separating weirs built into the fluidized bed which divide up the fluidized bed into a plurality of chambers arranged in series and which are provided with openings for the flow of material from one chamber into the next chamber, heat exchangers arranged in the fluidized bed in each chamber, which separate the heating medium and the material from one another, and supply means for a fluidizing gas in each chamber, wherein each chamber is equipped with supply means for water vapor, a temperature sensor and a measurement apparatus for the partial pressure of the water vapor; and including regulating circuits for the regulation of the temperature of the heat exchangers and/or of the fluidizing gas for the respective chamber and also for the supply of water vapor to the respective chamber in dependence on measured values.

2. Apparatus in accordance with claim 1, wherein the supply means for the fluidizing gas is simultaneously the supply means for the water vapor.

3. Apparatus in accordance with claim 1 wherein at least the first two chambers are maintained at temperatures and water vapor partial pressures which prevent an anhydrite formation.

4. Apparatus in accordance with claim 1 wherein at least one chamber is maintained at temperatures and water vapor partial pressures at which the beta-hemihydrate supplied to it from previous chambers is at least partly converted into anhydrite III.

5. Apparatus in accordance with claim 1, including further separating weirs provided with openings and built into the chambers.

6. Apparatus in accordance with claim 1, including at least one cooling chamber arranged before the product outlet, supply means for the liquidizing gas, and a heat exchanger.

7. Apparatus in accordance with claim 6 wherein the cooling chamber is provided with a temperature sensor and a measuring apparatus for the partial pressure of the water vapor.

8. Apparatus for the thermal treatment of gypsum in a fluidized bed comprising a material inlet and a product outlet, a plurality of separating weirs built into the fluidized bed which divide up the fluidized bed into a plurality of chambers arranged in series and which are provided with openings for the flow of material from one chamber into the next chamber, heat exchangers arranged in the fluidized bed in each chamber, which separate the heating medium and the material from one another, and supply means for a fluidizing gas in each chamber, wherein each chamber is equipped with supply means for water vapor and a temperature sensor; and including regulating circuits for the regulation of the temperature of the heat exchangers and/or of the fluidizing gas for the respective chamber in dependence on measured values and for the regulation of the supply of water vapor to the respective chamber in dependence on a partial pressure of the water vapor calculated from the moisture and quantity of the starting material and also from the quantity of the supplied fluidizing gas.

9. Apparatus in accordance with claim 8 wherein at least one chamber is maintained at temperatures and water vapor partial pressures at which the beta-hemihydrate supplied to it from previous chambers is at least partly converted into anhydrite III.

10. Apparatus in accordance with claim 8 wherein at least the first two chambers are maintained at temperatures and water vapor partial pressures which prevent an anhydrite formation.

11. Apparatus in accordance with claim 8 wherein the supply means for the fluidizing gas is simultaneously the supply means for the water vapor.

12. Apparatus in accordance with claim 8, including further separating weirs provided with openings and built into the chambers.

13. Apparatus in accordance with claim 8, including at least one cooling chamber arranged before the product outlet, a supply means for the liquidizing gas, and a heat exchanger.

14. Apparatus in accordance with claim 13 wherein the cooling chamber is provided with a temperature sensor and a measuring apparatus for the partial pressure of the water vapor.

* * * * *